US011233422B2

(12) United States Patent
Ha et al.

(10) Patent No.: US 11,233,422 B2
(45) Date of Patent: Jan. 25, 2022

(54) COVER COMPRISING RELAY COIL FOR WIRELESS CHARGING, OR ELECTRONIC DEVICE COMPRISING SAME

(71) Applicant: Samsung Electronics Co., Ltd., Suwon-si (KR)

(72) Inventors: Mincheol Ha, Suwon-si (KR); Dongzo Kim, Yongin-si (KR); Ji-Won Kim, Suwon-si (KR); Jae-Wan Park, Yongin-si (KR); Chang-Hak O, Suwon-si (KR); Jongchul Hong, Seongnam-si (KR); Yong Sang Yun, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/640,017

(22) PCT Filed: Apr. 11, 2018

(86) PCT No.: PCT/KR2018/004228
§ 371 (c)(1),
(2) Date: Feb. 18, 2020

(87) PCT Pub. No.: WO2019/035528
PCT Pub. Date: Feb. 21, 2019

(65) Prior Publication Data
US 2020/0251928 A1    Aug. 6, 2020

(30) Foreign Application Priority Data

Aug. 18, 2017  (KR) ........................ 10-2017-0104934

(51) Int. Cl.
*H02J 50/00* (2016.01)
*H02J 50/80* (2016.01)
*H02J 50/12* (2016.01)

(52) U.S. Cl.
CPC ............ *H02J 50/005* (2020.01); *H02J 50/12* (2016.02); *H02J 50/80* (2016.02)

(58) Field of Classification Search
None
See application file for complete search history.

(56) References Cited

U.S. PATENT DOCUMENTS 10,141,770 B2 * 11/2018 Partovi ................. B60L 53/122
10,148,321 B2 * 12/2018 Jang ..................... H04B 5/0081
(Continued)

FOREIGN PATENT DOCUMENTS

KR  10-2015-0045875 A    4/2015
KR  10-2015-0047085 A    5/2015
(Continued)

OTHER PUBLICATIONS

ISA/KR, International Search Report and Written Opinion of the International Searching Authority, International Application No. PCT/KR2018/004228, dated Jul. 18, 2018, 10 pages.

*Primary Examiner* — Thomas J. Hiltunen

(57) ABSTRACT

According to various embodiments, provided is an electronic device, which comprises a housing and a relay circuit located inside the housing and is capable of receiving and/or retransmitting an electromagnetic field of an external electronic device, wherein the relay circuit is configured to form a resonant frequency higher than that of an operating frequency range of the electromagnetic field transmitted by the external electronic device. Additional various embodiments are possible.

13 Claims, 8 Drawing Sheets

(56) References Cited

U.S. PATENT DOCUMENTS

| | | | | |
|---|---|---|---|---|
| 10,903,688 | B2* | 1/2021 | Peralta | H02J 50/40 |
| 2013/0194155 | A1* | 8/2013 | Kuroda | H01Q 1/2208 |
| | | | | 343/867 |
| 2014/0159502 | A1* | 6/2014 | Shimokawa | H02J 7/00034 |
| | | | | 307/104 |
| 2015/0048790 | A1 | 2/2015 | Rudser et al. | |
| 2015/0108850 | A1 | 4/2015 | Cho et al. | |
| 2015/0115725 | A1* | 4/2015 | Kang | H02J 50/40 |
| | | | | 307/104 |
| 2015/0130409 | A1 | 5/2015 | Lee et al. | |
| 2020/0328617 | A1* | 10/2020 | Sherman | H02J 50/80 |

FOREIGN PATENT DOCUMENTS

| | | |
|---|---|---|
| KR | 10-2015-0050024 A | 5/2015 |
| WO | 2013031988 A1 | 3/2013 |

* cited by examiner

COVER COMPRISING RELAY COIL FOR WIRELESS CHARGING, OR ELECTRONIC DEVICE COMPRISING SAME

CROSS-REFERENCE TO RELATED APPLICATIONS

This application is a 371 National Stage of International Application No. PCT/KR2018/004228, filed Apr. 11, 2018, which claims priority to Korean Patent Application No. 10-2017-0104934, filed Aug. 18, 2017, the disclosures of which are herein incorporated by reference in their entirety.

BACKGROUND

1. Field

Various embodiments of the disclosure relate to a cover including a relay coil for wireless charging or an electronic device including the same.

2. Description of Related Art

Electronic devices may be applied to various fields closely related to our lives. Electronic devices with various sizes may be released according to their respective functions and users' preference. In addition, a housing forming an exterior of an electronic device or an accessory device (for example, a protection housing, a protection cover, or the like) separately mounted on an electronic device to protect at lease some areas of the electronic device is widely used.

Such accessory devices are provided with various additional functions, in addition to their basic functions of protecting electronic devices or enhancing the aesthetic sense, thereby enhancing user convenience of electronic devices.

SUMMARY

Methods for charging a battery included in an electronic device may include a wired charging method and a wireless charging method. The wired charging method may include a method for charging a battery of an electronic device by directly connecting a connector of a charging device (for example, a traveler adaptor (TA)) to a connector port separately provided on an outside of the electronic device. The wireless charging method is a method for charging a battery of an electric device by using a magnetic induction or resonance method without a separate physical charging line, and performs a charging operation with an electronic device being placed on a charging pad of a wireless power transmission device (for example, a wireless charging device) separately provided. The wireless charging method can charge an electronic device placed on a pad of a wireless power transmission member even if the electronic device is protected by a protection cover (for example, an accessory device) of a dielectric material, and thus using convenience of the electronic device is enhanced.

However, a distance between a transmission coil member of a wireless power transmission device and a reception coil member of an electronic device may increase due to thickness of a protection cover, or alignment therebetween may not be exactly established. Therefore, charging efficiency may be reduced, and accordingly, there may be problems that heat increases, wireless charging is interrupted, or wireless charging is not entirely performed.

Various embodiments of the disclosure provide a cover including a relay coil for wireless charging or an electronic device including the same.

Various embodiments of the disclosure provide an accessory device including a relay coil for wireless charging or an electronic device including the same.

According to various embodiments of the disclosure, an electronic device may include a housing and a relay circuit disposed inside the housing to receive and/or retransmit an electromagnetic field of an external electronic device, and the relay circuit may be configured to form a resonance frequency higher than an operating frequency range of the electromagnetic field transmitted by the external electronic device.

According to various embodiments, an electronic device may include a housing configured to be removably coupled to one surface of an external electronic device; and a coil member disposed inside the housing, and, when the electronic device is coupled with the external electronic device, the coil member may be formed to be positioned on at least part of an area of a coil member of the external electronic device, and an inner diameter D1 of a hollow portion of the coil member of the housing may be equal to or larger than an inner diameter D2 of a hollow portion of the coil member of the external electronic device. Herein, the hollow portion may include a portion having an opening formed in a center thereof.

According to various embodiments, a wireless charging system may include a wireless power reception device including a reception coil member, a wireless power transmission device including a transmission coil member to transmit wireless power to the wireless power reception device, and an accessory device which is removably coupled with the wireless power reception device and includes a relay coil member disposed therein. Wireless power outputted through the wireless power transmission device may be relayed through the relay coil member, and may be transmitted to the wireless power reception device, and a resonance frequency of the relay coil member may be set to be higher than an operating frequency range of the transmission coil member.

According to various embodiments of the disclosure, since a protection cover applied to an electronic device as an accessory device includes a relay coil device to relay wireless power outputted from a wireless power transmission device, degradation of wireless charging efficiency can be prevented even when a distance the accessory device and the electronic device increases or there is slight misalignment therebetween.

DETAILED DESCRIPTION

Figure 1:
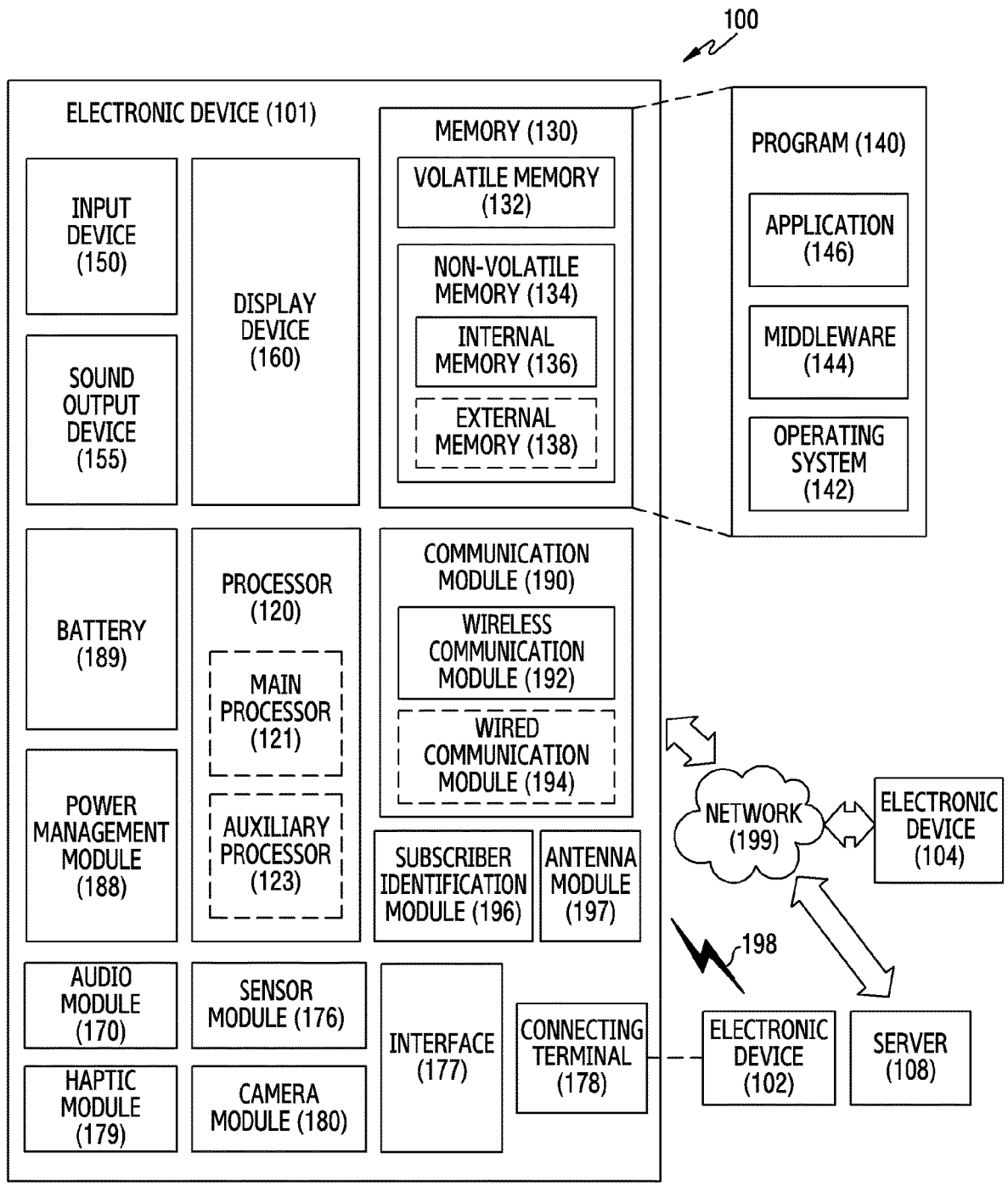
FIG. 1 is a block diagram of an electronic device in a network environment according to various embodiments of the disclosure.

FIG. 1 is a block diagram illustrating an electronic device in a network environment according to various embodiments.

Referring to FIG. 1, the electronic device 101 in the network environment may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network using sub scriber information (e.g., international mobile sub scriber identity (IMSI)) stored in the sub scriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

According to various embodiments, the electronic device 101 may include a wireless power reception member according to embodiments of the disclosure. According to an embodiment, the wireless power reception member may include a reception coil member (for example, a reception coil member of FIG. 2B) to receive wireless power received from a wireless power transmission device by using an electromagnetic resonance method. According to an embodiment, the wireless power received from the reception coil member may be used to charge the battery 189 under control of the power management module 188.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
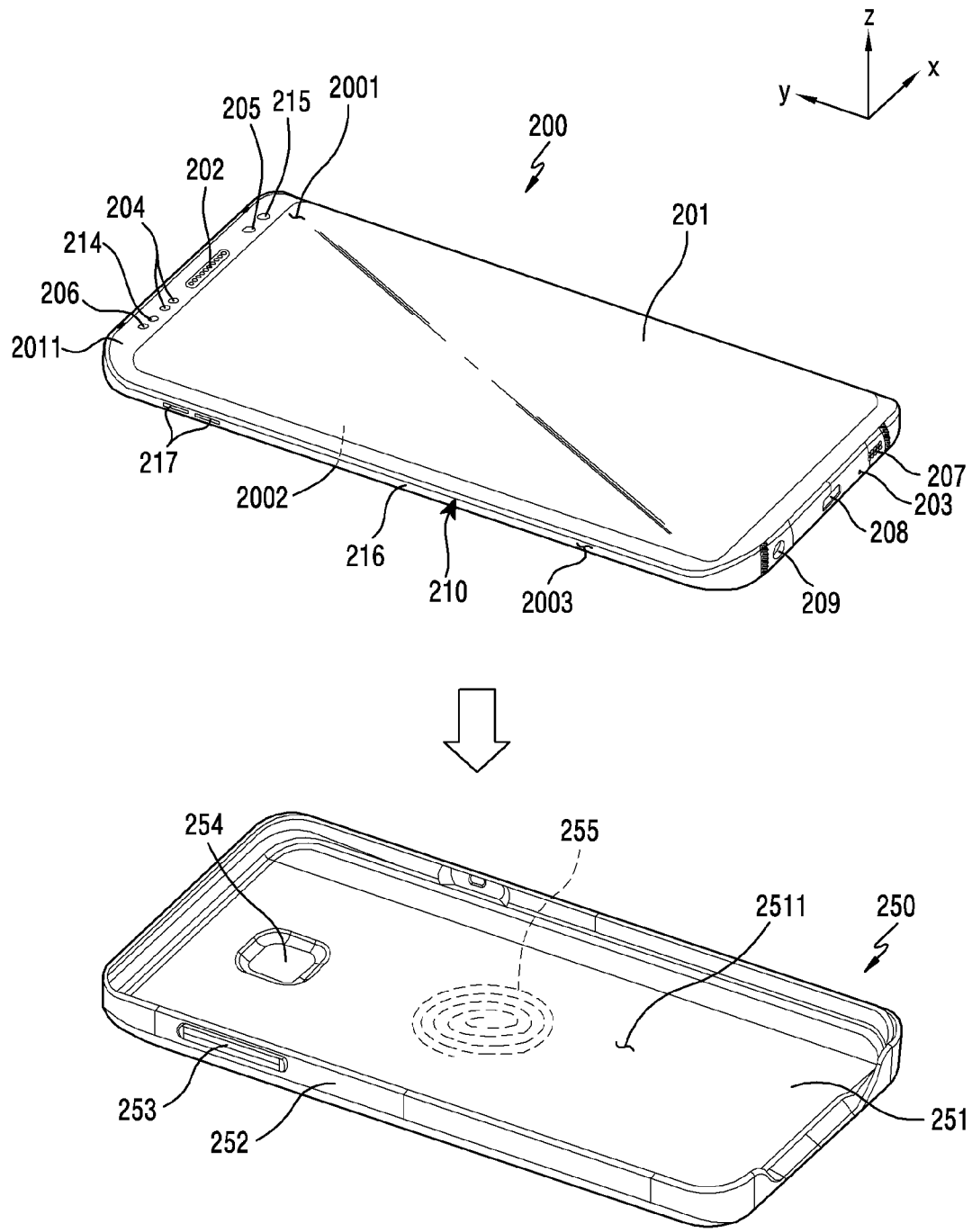
FIG. 2A is an exploded perspective view of an electronic device and a protection cover according to various embodiments of the disclosure.
Figure 2B:
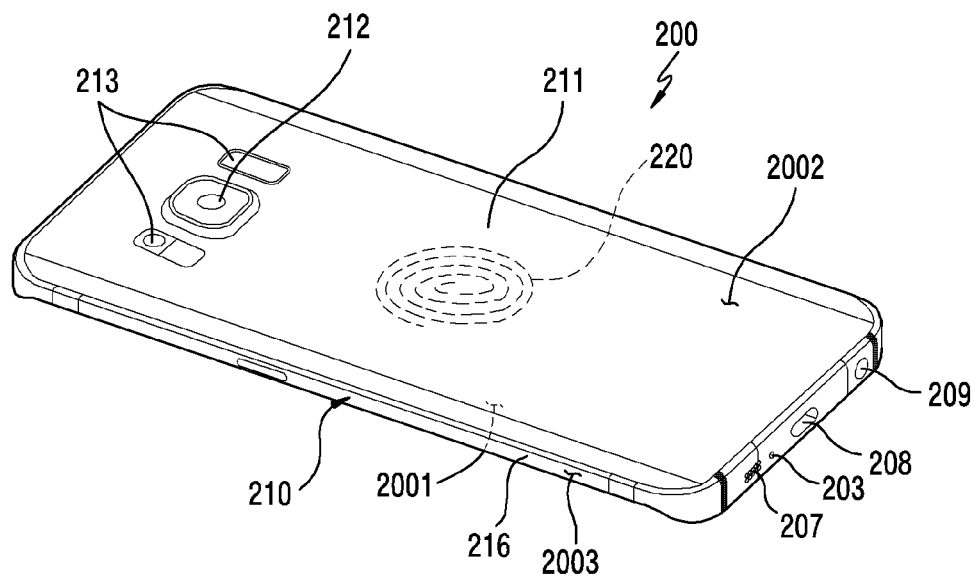
FIG. 2B is a perspective view of a rear surface of the electronic device according to various embodiments.

FIG. 2A is an exploded perspective view of an electronic device and a protection cover according to various embodiments of the disclosure. FIG. 2B is a perspective view of a rear surface of the electronic device according to various embodiments of the disclosure.

The electronic device 200 of FIGS. 2A and 2B may be similar to the electronic device of FIG. 1 at least partially, or may include other embodiments of the electronic device.

Referring to FIGS. 2A and 2B, the electronic device 200 (for example, the electronic device 101) may include a housing 210. According to an embodiment, the housing 210 may be formed with a conductive member and/or a nonconductive member. According to an embodiment, the housing 210 may include a first surface 2001 (for example, a front surface or a top surface) facing in a first direction (for example, a Z-axis direction), a second surface 2002 (for example, a rear surface or a bottom surface) disposed in a direction opposite to the first surface 2001, and a side surface 2003 disposed to surround at least part of the first surface 2001 and the second surface 2002. According to an embodiment, the side surface 2003 may be coupled with a front surface plate 2011 (for example, a glass plate including various coating layers, or a polymer plate), and a rear surface plate 211, and may be formed by a side surface member 216. According to an embodiment, the rear surface plate 211 may be formed with, for example, coated or colored glass, ceramic, polymer, metal (for example, aluminum, stainless steel (STS), or magnesium), or a combination of at least two of the above-mentioned materials. According to an embodiment, the side surface 2003 may include, for example, metal, polymer (for example, plastic).

According to various embodiments, the side surface 2003 may be coupled with the front surface plate 2011 and the rear surface plate 211, and may be formed by the side surface member 216 (or a "side surface bezel structure") including metal and/or polymer. In an embodiment, the rear surface plate 211 and the side surface member 216 may be integrally formed with each other, and may include the same material (for example, a metallic material such as aluminium or magnesium). According to an embodiment, at least part of the side surface member 216 may be electrically isolated by intervention of at least one nonconductive portion and may be used as an antenna.

According to various embodiments, the electronic device 200 may include the front surface plate 2011 (for example, a window or glass plate) disposed on the first surface 2001, and a display 201 (for example, a touch screen display) disposed to be exposed through at least some area of the front surface plate 2011. According to an embodiment, the display 201 may be coupled with or disposed adjacent to a touch sensing circuit, a pressure sensor to measure an intensity of a touch (pressure), and/or a pen detection sensor (for example, a digitizer) to detect a stylus pen in a magnetic field method.

According to various embodiments, the electronic device 200 may include a call receiver hole 202. According to an embodiment, the electronic device 200 may be controlled to allow a user to speak to the other person through the call receiver hole 202 by using a speaker disposed therein. According to an embodiment, the electronic device 200 may include a microphone hole 203. According to an embodiment, the electronic device 200 may receive an external sound or may transmit a user's voice to the other person through the microphone hole 203 by using at least one microphone disposed therein to detect a direction of a sound.

According to various embodiments, the electronic device 200 may include at least one key input device. According to an embodiment, the key input device may include at least one side key button 217 disposed on the side surface 2003 of the housing 210. According to an embodiment, the at least one side key button 217 may include a volume control button, a wake up button, or a button for performing a specific function (for example, an artificial intelligence (AI) execution function or a rapid voice recognition execution mode entering function, or the like).

According to various embodiments, the electronic device 200 may include components which are exposed to the display 201, or perform a function through the front surface plate 2011 but are disposed not to be exposed and perform various functions of the electronic device 200. According to an embodiment, at least some of the components may be disposed to be in contact with an external environment from the inside of the electronic device through at least some area of the front surface plate 2010 of a transparent material. According to an embodiment, the components may include at least one sensor module 204. The sensor module 204 may include, for example, an illuminance sensor (for example, a light sensor), a proximity sensor (for example, a light sensor), an infrared sensor, an ultrasonic sensor, a fingerprint recognition sensor, a face recognition sensor, or an iris recognition sensor. According to an embodiment, the components may include a first camera device 205. According to an embodiment, the components may include an indicator 206 (for example, a light emitting diode (LED) device) to visually provide state information of the electronic device 200 to the user. According to an embodiment, the components may include a light source 214 (for example, an infrared LED) disposed at one side of the call receiver hole 202. According to an embodiment, the components may include an imaging sensor assembly 215 (for example, an iris camera) to detect an iris image when light generated from the light source 214 is irradiated around user's eyes. According to an embodiment, at least one of the components may be disposed to be exposed through at least some area of the second surface 2002 (for example, the rear surface or the bottom surface) facing in the direction (for example, −Z-axis direction) opposite to the first direction of the electronic device 200.

According to various embodiments, the electronic device 200 may include an external speaker hole 207. According to an embodiment, the electronic device 200 may emit a sound through the external speaker hole 207 by using the speaker disposed therein. According to an embodiment, the electronic device 200 may include a first connector hole 208 (for example, an interface connector port) to perform a data exchange function by an external device and to receive external power and to charge the electronic device 200. According to an embodiment, the electronic device 200 may include a second connector hole 209 (for example, an ear jack assembly) to accommodate an ear jack of an external device.

According to various embodiments, the electronic device 200 may include the rear surface plate 211 (for example, a rear surface window) disposed on the second surface 2002. According to an embodiment, a rear facing camera device 212 may be disposed on the rear surface plate 211. At least one electronic component 213 may be disposed in the proximity of the rear facing camera device 212. According to an embodiment, the electronic component 213 may include at least one of an illuminance sensor (for example, a light sensor), a proximity sensor (for example, a light sensor), an infrared sensor, an ultrasonic sensor, a heart rate sensor, a fingerprint recognition sensor, or a flash device.

According to various embodiments, the display 201 may include a touch panel and a display panel which are stacked on the rear surface of the front surface plate 2011. According to an embodiment, an image displayed through the display panel may be provided to a user through the front surface plate 2011 of a transparent material. According to an embodiment, the front surface plate 2011 may be formed by using various materials, such as glass of a transparent material, or acryl.

According to various embodiments, the electronic device 200 may include a waterproof structure. According to an embodiment, the electronic device 200 may include at least one seal member disposed therein for waterproofing. According to an embodiment, the at least one seal member may be disposed between the display 201 and the side surface member 216 and/or between the side surface member 216 and the rear surface plate 211.

According to various embodiment, the protection cover 250 may be disposed to surround at least some area of the electronic device 200. According to an embodiment, the protection cover 250 may be coupled with the electronic device 200 to protect the electronic device 200 from an external shock or to ensure an aesthetic design. According to an embodiment, the protection cover 250 may include a mounting surface 251 disposed to be in contact with at least some area of the electronic device 200, and a cover side surface 252 extended to a predetermined height along a border of the mounting surface 251. According to an embodiment, the protection cover 250 may include a mounting space 255 provided to enclose at least some area (for example, the second surface (rear surface) and at least some area of the side surface 2003) of the electronic device 200 through the mounting surface 251 and the cover side surface 252. According to an embodiment, the mounting surface 251 may be formed to have a size to be substantially in contact with the second surface 2002 (for example, the rear surface) of the electronic device 200, and the cover side surface 252 may be formed to have a height to enclose the side surface 2003 of the electronic device 200. According to an embodiment, the protection cover 250 may have at least one key button pressing protrusion 253 or a key button hole (not shown) disposed on the cover side surface 252. The key button pressing protrusion 253 may press the key button 217 disposed on the side surface of the electronic device 200 even when the electronic device 200 is mounted on the protection cover 250. Alternatively, the key input device of the electronic device 200 may be exposed to the outside through the key button hole (not shown). According to an embodiment, the protection cover 250 may have at least one opening 254 formed thereon. According to an embodiment, electronic components (for example, a camera device, a proximity sensor, a flash device, or the like) which are disposed in the electronic device 200 and should be in contact with an external environment may be exposed to the outside through the opening 254 even when the electronic device 200 is mounted on the protection cover 250.

According to various embodiments, the protection cover 250 may include a relay coil device 255 embedded therein. According to an embodiment, the relay coil device 255 may be disposed on a position overlaying at least some area of the mounting surface 255 of the protection cover 250. According to an embodiment, the relay coil device 255 may be disposed on a position overlaying at least some area of a reception coil member 220 disposed in the electronic device 200 when the electronic device 200 is mounted on the protection cover 250. According to an embodiment, even when the electronic device 200 to which the protection cover 250 is coupled is placed at an increased distance from a wireless power transmission device (for example, a wireless power transmission device 300 of FIG. 3) or is placed, being misaligned therefrom (an undesired disposal for wireless charging), wireless power transmitted from the wireless power transmission device (for example, the wireless power transmission device 300 of FIG. 3) may be properly transmitted to the reception coil member 220 of the electronic device 200 through the relay coil device 255 of the protection cover 250, such that degradation of charging efficiency can be prevented or compensated for.

Figure 3:
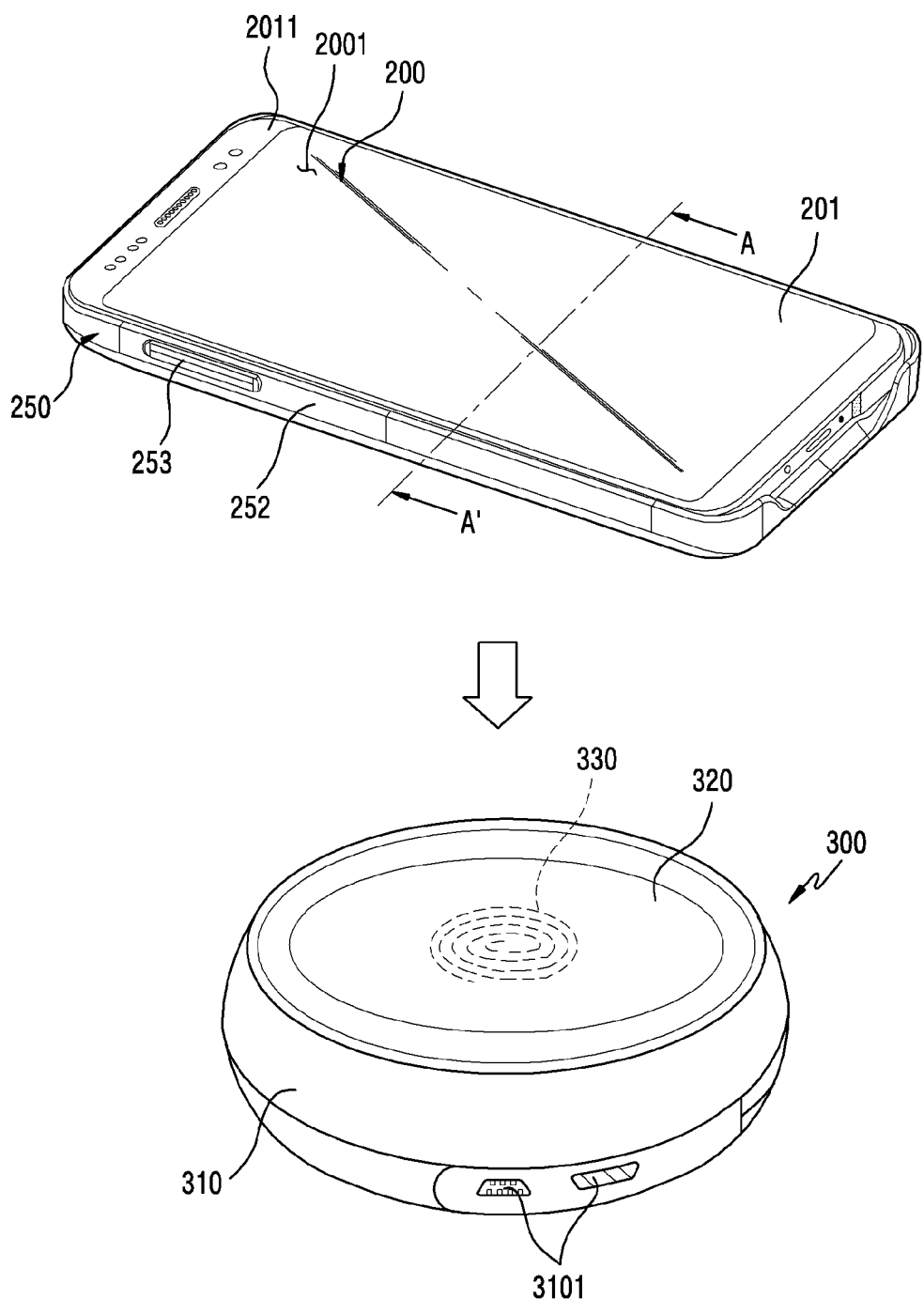
FIG. 3 is a perspective view of the electronic device mounted on the protection cover and a wireless power transmission device according to various embodiments of the disclosure.

FIG. 3 is a perspective view of the electronic device mounted on the protection cover and the wireless power transmission device according to various embodiments of the disclosure.

Referring to FIG. 3, when the electronic device 200 is mounted on the protection cover 250, at least some area of the first surface 2001 (for example, the front surface) of the electronic device 200 may remain exposed to the outside. According to an embodiment, when the electronic device 200 is mounted on the protection cover 250, the display 201 disposed to be seen through the front surface plate 2011 of the first surface 2001 may be exposed to the outside.

According to various embodiments, the electronic device 200 mounted on the protection cover 250 may be disposed to be placed on the wireless power transmission device 300 to be wirelessly charged. The wireless power transmission device 300 may include a body 310 and a charging pad 320 disposed on an upper portion of the body 310. According to an embodiment, the charging pad 320 may include a wireless power transmission coil member 330 embedded therein. According to an embodiment, the body 310 may include at least one connector port 3101, and may contain an external power source (for example, a direct current power source or an alternating current power source) or may communicate data with another external electronic device through the connector port 3101.

According to various embodiments, when the electronic device 200 is mounted on the protection cover 250 as described above, a disposal position of the electronic device 200 may be defined by the cover side surface 252 of the protection cover 200. Therefore, a reception coil member (for example, the reception coil member 220 of FIG. 2B) of the electronic device 200 and a relay coil device (for example, the relay coil device 255 of FIG. 2A) of the protection cover 250 may be disposed to overlap each other. According to an embodiment, when the protection cover 250 to which the electronic device 200 is coupled is placed on the charging pad 320 of the wireless power transmission device 300, wireless charging can be smoothly performed by the relay coil device (for example, the relay coil device 255 of FIG. 2A) of the protection cover 250 even if a distance between the reception coil member 220 of the electronic device 200 and the transmission coil member 330 of the wireless power transmission device 300 increases or the reception coil member and the transmission coil member are slightly misaligned.

Figure 4A:
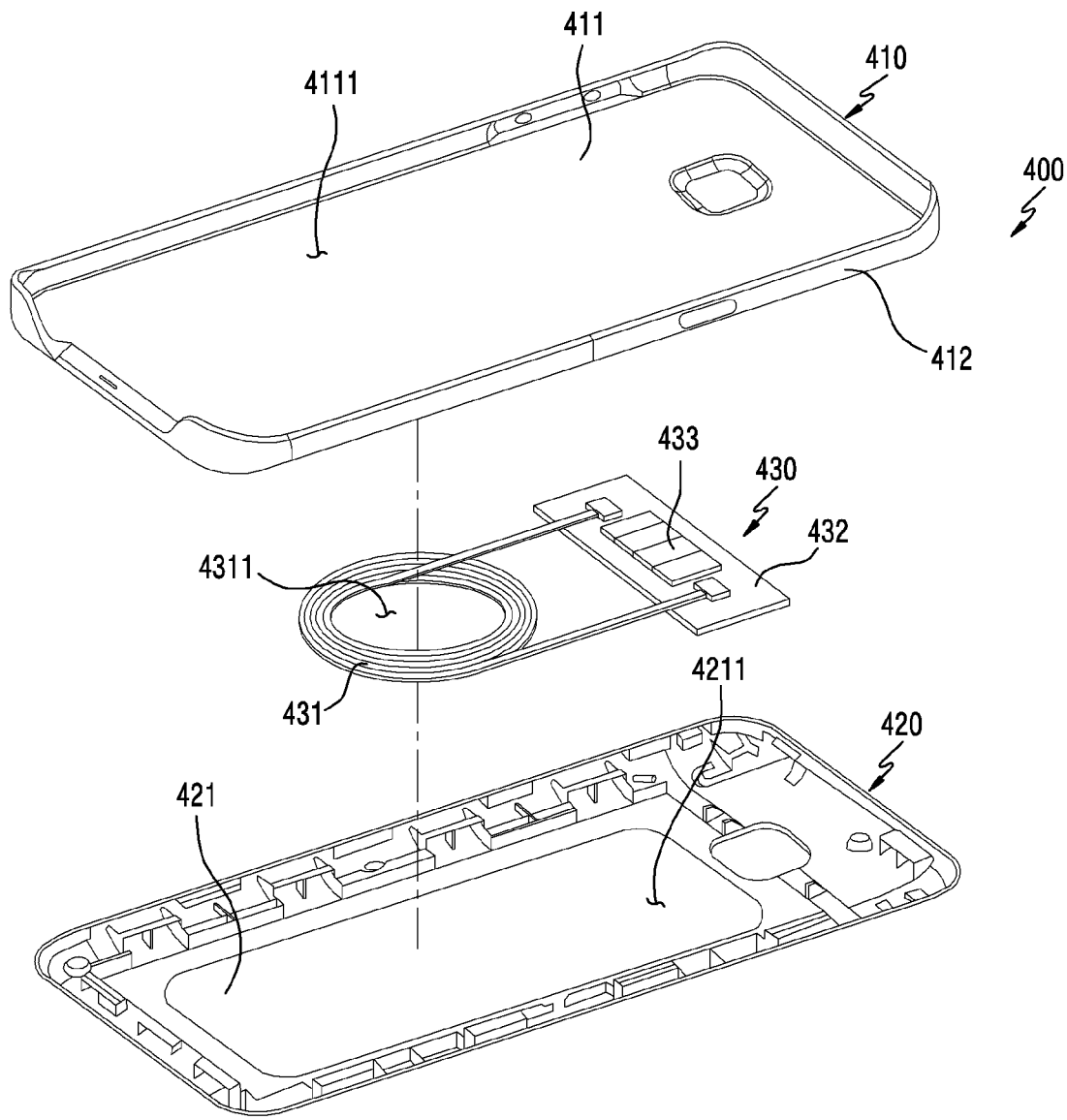
FIG. 4A is an exploded perspective view of a protection cover according to various embodiments of the disclosure.
Figure 4B:
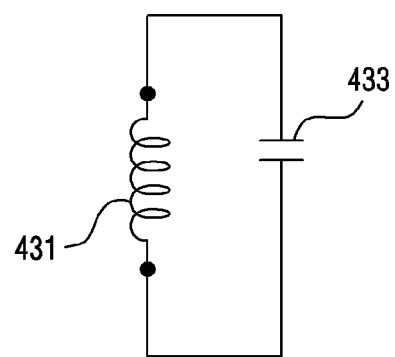
FIG. 4B is an equivalent circuit diagram of a relay coil device according to various embodiments of the disclosure.

FIG. 4A is an exploded perspective view of a protection cover according to various embodiments of the disclosure. FIG. 4B is an equivalent circuit diagram of a relay coil device according to various embodiments of the disclosure.

The protection cover 400 of FIG. 4A may be similar to the protection cover 250 of FIGS. 2A to 3 at least partially, or may include other embodiments of the protection cover.

Referring to FIGS. 4A and 4B, the protection cover 400 may include a first housing 410, a second housing 420 coupled with the first housing 410, and a relay coil device 430 disposed in a space between the first housing 410 and the second housing 420. According to an embodiment, the first housing 410 (for example, a front surface housing, a front surface case frame) may include a mounting surface 411 on which an electronic device (for example, the electronic device 200 of FIG. 2A) is mounted, and a side surface 412 extended to a predetermined height along a border of the mounting surface 411. According to an embodiment, the protection cover 400 may include a mounting space 4111 provided by the mounting surface 411 and the side surface 412 to guard at least part of the electronic device (for example, the electronic device 200 of FIG. 2A).

According to various embodiments, the second housing 420 (for example, a rear surface housing, a rear surface case frame) may be coupled with the first housing 410. According to an embodiment, the first housing 410 and the second housing 420 may be formed with a dielectric material (for example, a synthetic resin material), and may be coupled to each other by bonding, ultrasonic bonding, thermal boding, or a mechanical coupling member (for example, a piece, a screw, or the like). According to an embodiment, the second housing 420 may provide an inner surface 4211, and the relay coil device 430 may be disposed on the inner surface 4211. Accordingly, when the first housing 410 and the second housing 420 are coupled to each other, the relay coil device 430 may be disposed in at least some area of the space between the first housing 410 and the second housing 420. According to an embodiment, the electronic device (for example, the electronic device 200 of FIG. 2A) may be mounted by the structure of the first housing 410, but is not limited hereto. For example, the electronic device (for example, 200 of FIG. 2A) may be configured to have least part thereof accommodated by coupling of the first housing of a plate type and the second housing having a side surface structure.

According to various embodiments, the relay coil device 430 may include a relay coil member 431 wound around a hollow portion 4311 multiple times, a substrate (printed circuit board (PCB)) 432 having an end of the relay coil member 431 mounted thereon, and a capacitor 433 mounted on the substrate 432 and electrically connected with the relay coil member 431. According to an embodiment, a resonance frequency of the relay coil device 430 may be determined according to a size (for example, a diameter) of the hollow portion 4311 of the relay coil member 431, the number of turns of the relay coil member 431, and/or a capacitance of the capacitor 433. According to an embodiment, the relay coil device 430 may have the relay coil member 431 and the substrate 431 separately configured, but is not limited hereto. For example, the relay coil device 430 may be configured with an integrated flexible printed circuit board (FPCB) to electrically connect the relay coil member 431 (for example, a conductive pattern) and the capacitor 433 mounted nearby. According to an embodiment, the relay coil device 430 is disposed in the inner space formed by coupling of the first housing 410 and the second housing 420 of the protection cover 400, but is not limited hereto. For example, when the protection cover 400 is formed by a single injection molding material, the relay coil device 430 may be disposed on an appropriate position by insert molding when the protection cover is injection molded.

According to various embodiments, the protection cover 400 interposed between the electronic device (for example, the electronic device 200 of FIG. 3) and the wireless power transmission device (for example, the wireless power transmission device 300 of FIG. 3) according to embodiments of the disclosure is described, but is not limited hereto. For example, the relay coil device 430 according to embodiments of the disclosure may be included in various accessory devices which are interposed between the electronic device (for example, the electronic device 200 of FIG. 3) and the wireless power transmission device (for example, the wireless power transmission device 300 of FIG. 3), and are applied for the electronic device. For example, such accessory devices may include various structures such as a decoration member (for example, various stickers, logo, or emblem, or the like) mounted on the rear surface of the electronic device, or a protection film disposed only on the rear surface of the electronic device, in addition to the protection cover.

Figure 4C:
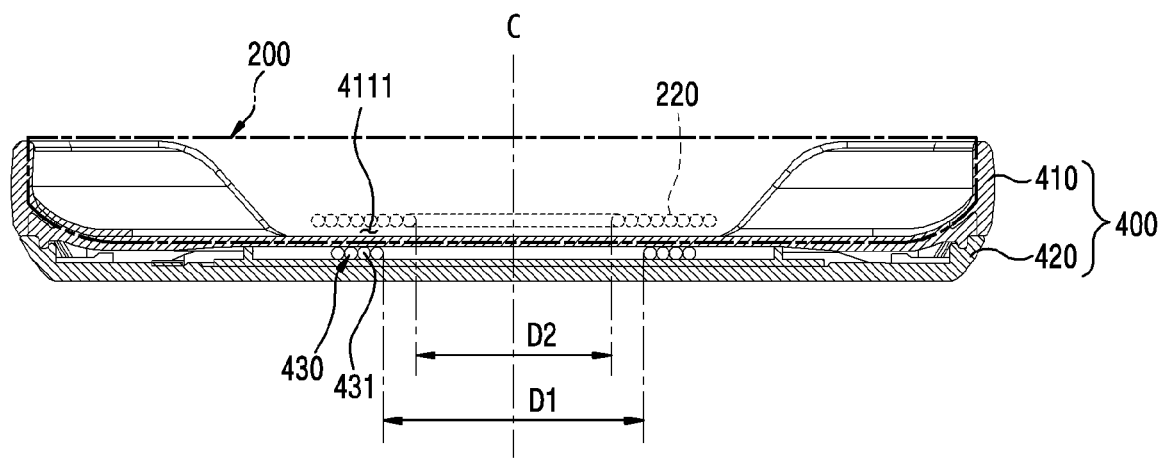
FIG. 4C is a cross-sectional view illustrating an alignment relationship between a relay coil member of a protection cover and a reception coil member of an electronic device according to various embodiments of the disclosure.

FIG. 4C is a cross-sectional view illustrating an alignment relationship between the relay coil member of the protection cover and the reception coil member of the electronic device according to various embodiments of the disclosure, and is a cross-sectional view taken on line A-A' of FIG. 3.

Referring to FIG. 4C, the relay coil device 430 may be disposed in the space between the first housing 410 and the second housing 420 of the protection cover 400. According to an embodiment, the relay coil member 431 of the relay coil device 430 may be formed by winding coil members multiple times around the circular hollow portion having a predetermined inner diameter D1. According to an embodiment, the reception coil member 220 disposed in the electronic device 200 mounted on the mounting space 4111 of the protection cover 400 may also be formed by winding coil members multiple times around a circular hollow portion having a predetermined inner diameter D2.

According to various embodiments, when the electronic device 200 is mounted on the protection cover 400, the inner diameter D2 of the reception coil member 220 may be disposed to overlap the inner diameter D1 of the relay coil member 431 at least partially. According to an embodiment, the inner diameter area of the reception coil member 220 may overlap to be disposed at least inside the inner diameter area of the relay coil member 431. According to an embodiment, the relay coil member 431 of the protection cover 400 and the reception coil member 220 of the electronic device may be disposed to have the same center C. According to an embodiment, the inner diameter D1 of the relay coil member 431 may be formed to be equal to or larger than the inner diameter D2 of the reception coil member 220 of the electronic device 200, such that wireless power transmitted from the wireless power transmission device (for example, the wireless power transmission device 300 of FIG. 3) can be efficiently relayed.

According to various embodiments, a resonance frequency of the relay coil device 430 may be set to be out of an operating frequency range of the wireless power transmission member (for example, the wireless power transmission device 300 of FIG. 3). This is to solve a problem that wireless power is not transmitted to the reception coil member 220 of the electronic device 200 if the resonance frequency of the relay coil device 430 is included in an operating frequency band of the wireless power transmission device (for example, the wireless power transmission device 300) when a magnetic field induced from the wireless power transmission device (for example, the wireless power transmission device 300 of FIG. 3) is induced to the reception coil member 220 of the electronic device 200 through the relay coil device 430 and generates a current. For example, the resonance frequency f0 of the relay coil device 430 may be determined by Equation 1 presented below:

$$f_0 = \frac{1}{2\pi\sqrt{LC}} \qquad \text{Equation 1}$$

where L is an inductance of the relay coil member 431 and C is a capacitance of the capacitor 433.

Furthermore, since the resonance frequency $f_0$ of the relay coil device 430 should be out of the operating frequency band range of the wireless power transmission device (for example, the wireless power transmission device 300 of FIG. 3), the resonance frequency may be set to satisfy Equation 2 presented below:

$$f_{1max} < f_0 < f_{1max} \times 1.2 \sim 1.3 \qquad \text{Equation 2}$$

where $f_0$ is a resonance frequency of the relay coil device 430, and may be determined within a range of 1.3 times the upper limit operating frequency $f_{1max}$ of the wireless power transmission device at the upper limit operating frequency $f_{1max}$ of the wireless power transmission device (for example, the wireless power transmission device 300 of FIG. 3).

Figure 5:
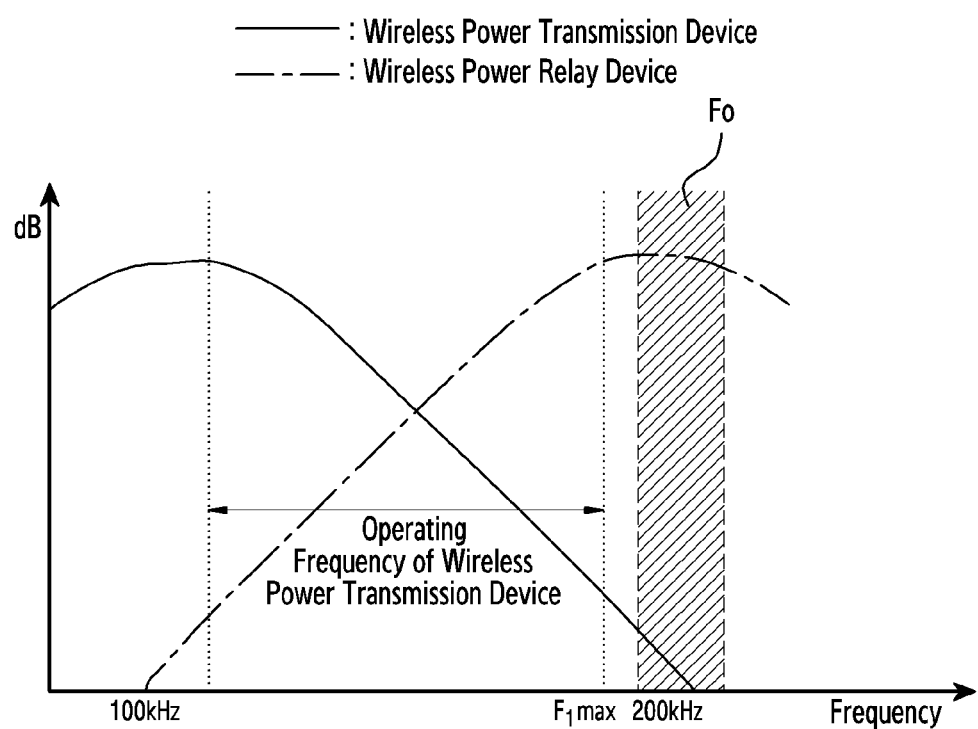
FIG. 5 is a graph illustrating an operating frequency band of a relay coil device embedded in a protection cover according to various embodiments of the disclosure.

FIG. 5 is a graph showing an operating frequency band of a relay coil device embedded in a protection cover according to various embodiments of the disclosure, and shows a frequency of a wireless power transmission device and a frequency range of the relay coil device. According to an embodiment, the relay coil device 430 may be set to have the opposite curve to the frequency of the wireless power transmission device (for example, the wireless power transmission device 300 of FIG. 3) to compensate for the frequency. According to an embodiment, when the wireless power transmission device (for example, the wireless power transmission device 300 of FIG. 3) has an operating frequency ranging from 100 kHz to 190 kHz, the resonance frequency f0 of the relay coil device 430 may be set within a range from 190 kHz to 247 kHz according to Equation 2 presented above. For example, when the wireless power transmission device (for example, the wireless power transmission device 300 of FIG. 3) has an operating frequency ranging from 110 kHz to 205 kHz according to the wireless power consortium (WPC) standard, the resonance frequency f0 of the relay coil device 430 may be set within a range from 205 kHz to 266 kHz according to Equation 2 presented above. For example, when the wireless power transmission device (for example, the wireless power transmission device 300 of FIG. 3) has an operating frequency ranging from 150 kHz to 300 kHz according to the power matters alliance (PMA) standard, the resonance frequency f0 of the relay coil device 430 may be set within a range from 300 kHz to 390 kHz according to Equation 2 presented above.

According to various embodiments, when the resonance frequency of the relay coil device 430 is set according to Equation 2 described above, a result shown in table 1 presented below may be obtained.

TABLE 1

| Wireless Charging Pad | Holding Mode | Charing Mode | Efficiency according to Rx Coil (Center to Center Align) | | |
|---|---|---|---|---|---|
| | | | Default | +Protective Standing Cover (4.85T) | Relay coil used |
| EP-PG950 | PAD | Normal | 66.26% | 50.93% | 62.20% |
| | | AFC | 68.65% | 55% | 63.70% |
| | Stand vertically | Normal | 58.56% | 44.22% | 55.48% |
| | | AFC | 62.49% | 46.69% | 57.33% |
| | Stand horizontally | Normal | 64.99% | 50.43% | 57.43% |
| | | AFC | 66.65% | 51.78% | 59.35% |

Normar Charging Load Condition: 5 V @ 900 mA/Fast Charging Load Condition: 10 V @ 650 mA As shown in table 1 described above, it can be seen that charging efficiency when the protection cover 400 applying the relay coil device 430 is used is greatly higher than that when a protection cover without a relay coil device is used.

According to various embodiments, an inductance of the relay coil member 431 is set to a range from 0.5 μH to 2.0 μH, and thus may be configured to have a value relatively smaller than an inductance (for example, 6 μH to 7 μH) of the transmission coil member (for example, the transmission coil member 330 of FIG. 3) of the wireless power transmission device (for example, the wireless power transmission device 300 of FIG. 3). This is because a coil member used as an inductor is a passive element for inducing a voltage in proportion to a change of a current, and serves to suppress an abrupt change of a current, and, when a coil relay device is designed, an inductance should be designed to be relatively low in order to cope with an abrupt change in a load condition of an electronic device.

According to various embodiments, the relay coil member 431 of the relay coil device 430 and the reception coil member 220 of the electronic device 200 are formed to have circular hollow portions having predetermined inner diameters D1, D2, but this should not be considered as limiting. For example, the hollow portion of each coil member may be formed in various shapes (for example, a substantially rectangular shape) as long as at least one of the above-described conditions is satisfied, that is, the inductance of the relay coil member 431 is set to be lower than the inductance of the transmission coil member (for example, the transmission coil member 330 of FIG. 3) of the wireless power transmission device (for example, the wireless power transmission device 300 of FIG. 3), the inner diameter D1 of the relay coil member 431 is equal to or larger than the inner diameter D2 of the reception coil member 220 of the electronic device 200, or the resonance frequency f0 of the relay coil device 430 is set to be higher than the operating frequency band of the wireless power transmission device (for example, the wireless power transmission device 300 of FIG. 3).

According to various embodiment, an electronic device may include a housing, and a relay circuit disposed inside the housing to receive and/or retransmit an electromagnetic field of an external electronic device, and the relay circuit may be configured to form a resonance frequency higher than an operating frequency range of the electromagnetic field transmitted by the external electronic device.

According to various embodiments, the resonance frequency of the relay circuit may be set within a range of 1.3 times a maximum upper limit operating frequency at the maximum upper limit operating frequency in the operating frequency range of the external electronic device.

According to various embodiments, the resonance frequency of the relay circuit may be set within a range from 190 kHz to 247 kHz.

According to various embodiments, the electronic device may be configured to transmit the electromagnetic field received from the external electronic device to another external electronic device through the relay circuit.

According to various embodiments, the electronic device may be a protection cover, and the another external electronic device may be a communication electronic device that is removably mounted in at least some area of the housing of the protection cover, and is configured to receive the electromagnetic field transmitted from the protection cover.

According to various embodiments, the relay circuit may include a relay coil member comprising a hollow portion having a predetermined inner diameter D1, and a capacitor electrically connected with the relay coil member.

According to various embodiments, when the another external electronic device is mounted in the housing, the relay coil member may be disposed to overlap a reception coil member of the another external electronic device at least partially.

According to various embodiments, the inner diameter D1 of the relay coil member may be equal to or larger than an inner diameter D2 of the reception coil member.

According to various embodiments, an inductance of the relay circuit may be set to be relatively smaller than an inductance of the external electronic device.

According to various embodiments, the inductance of the relay circuit may be set within a range from 0.5 μH to 2.0 μH.

According to various embodiments, an electronic device may include: a housing configured to be removably coupled to one surface of an external electronic device; and a coil member disposed inside the housing, and, when the electronic device is coupled with the external electronic device, the coil member may be formed to be positioned on at least part of an area of a coil member of the external electronic device, and an inner diameter D1 of a hollow portion of the coil member of the housing may be equal to or larger than an inner diameter D2 of a hollow portion of the coil member of the external electronic device.

According to various embodiments, when the electronic device and the external electronic device are coupled to each other, the coil member of the housing may be disposed to overlap the coil member of the external electronic device at least partially.

According to various embodiments, the inductance of the coil member of the housing may be set within a range from 0.5 μH to 2.0 μH.

According to various embodiments, the electronic device may be a protection cover, and the external electronic device may be a communication electronic device that is removably mounted in at least some area of the housing of the protection cover, and is configured to receive an electromagnetic field transmitted from the protection cover.

According to various embodiments, when coupled with the external electronic device, the electronic device may be configured to relay an electromagnetic field transmitted by another external electronic device through the coil member of the electronic device, and to transmit the electromagnetic field to the external electronic device.

According to various embodiments, the coil member of the housing may be configured to form a resonance frequency higher than an operating frequency range of the electromagnetic field transmitted by the another external electronic device.

According to various embodiments, the resonance frequency of the coil member of the housing may be set within a range of 1.3 times a maximum upper limit operating frequency at the maximum upper limit operating frequency in the operating frequency range of the another external electronic device.

According to various embodiments, a wireless charging system may include a wireless power reception device including a reception coil member, a wireless power transmission device including a transmission coil member to transmit wireless power to the wireless power reception device, and an accessory device which is removably coupled with the wireless power reception device and includes a relay coil member disposed therein. Wireless power outputted through the wireless power transmission device may be relayed through the relay coil member, and may be transmitted to the wireless power reception device, and a resonance frequency of the relay coil member may be set to be higher than an operating frequency range of the transmission coil member.

According to various embodiments, the resonance frequency of the relay coil member may be set within a range of 1.3 times a maximum upper limit operating frequency at the maximum upper limit operating frequency in the operating frequency range of the transmission coil member.

According to various embodiments, the accessory device may include at least one of a protection cover protecting at least part of the wireless power reception device, a decoration member or a protection film disposed on at least part of the wireless power reception device.

In addition, the embodiments disclosed in the disclosure and the drawings are suggested for easy explanation of the technical features according to embodiments of the disclosure and better understanding of the embodiments of the disclosure, and are not intended to limit the scope of the embodiments of disclosure. Therefore, the scope of various embodiments of the disclosure should be interpreted as including all changes or modified forms derived based on the technical idea of the disclosure, in addition to the embodiments disclosed herein.

What is claimed is:

1. An electronic device comprising:
   a housing; and
   a relay circuit disposed inside the housing to receive and/or retransmit an electromagnetic field of an external electronic device,
   wherein the relay circuit is configured to form a resonance frequency higher than an operating frequency range of the electromagnetic field transmitted by the external electronic device,
   wherein an inductance of the relay circuit is set to be relatively smaller than an inductance of a transmission coil included in the external electronic device,
   wherein the resonance frequency of the relay circuit is set within a range of an upper limit operating frequency of the external electronic device and 1.3 times the upper limit operating frequency, and
   wherein the relay circuit includes a relay coil member having a first diameter that is smaller than a second diameter of a reception coil member included in another external electronic device.

2. The electronic device of claim 1, wherein the resonance frequency of the relay circuit is set within a range from 190 kHz to 247 kHz.

3. The electronic device of claim 1, wherein the electronic device is configured to transmit the electromagnetic field received from the external electronic device to the another external electronic device through the relay circuit.

4. The electronic device of claim 3, wherein the electronic device is a protection cover, and the another external electronic device is a communication electronic device that is removably mounted in at least some area of the housing of the protection cover, and is configured to receive the electromagnetic field transmitted from the protection cover.

5. The electronic device of claim 4, wherein the relay circuit comprises the relay coil member comprising a hollow portion having a predetermined inner diameter D1, and a capacitor electrically connected with the relay coil member.

6. The electronic device of claim 5, wherein, when the another external electronic device is mounted in the housing, the relay coil member is disposed to overlap the reception coil member of the another external electronic device at least partially.

7. The electronic device of claim 6, wherein the predetermined inner diameter D1 of the relay coil member is equal to or larger than an inner diameter D2 of the reception coil member.

8. The electronic device of claim 1, wherein the inductance of the relay circuit is set within a range from 0.5 µH to 2.0 µH.

9. An electronic device comprising:
   a housing including a relay circuit and configured to be removably coupled to one surface of an external electronic device; and
   a coil member disposed inside the housing,
   wherein, when the electronic device is coupled with the external electronic device, the coil member is formed to be positioned on at least part of an area of a coil member of the external electronic device, and an inner diameter D1 of a hollow portion of the coil member of the housing is equal to or larger than an inner diameter D2 of a hollow portion of the coil member of the external electronic device,
   wherein an inductance of the coil member is set to be relatively smaller than an inductance of a transmission coil included in another external electronic device,
   wherein a resonance frequency of the coil member is set within a range of an upper limit operating frequency of the another external electronic device and 1.3 times the upper limit operating frequency, and
   wherein the relay circuit includes the coil member having a first diameter smaller than a second diameter of another coil member of the external electronic device.

10. The electronic device of claim 9, wherein, when the electronic device and the external electronic device are coupled to each other, the coil member of the housing is disposed to overlap the coil member of the external electronic device at least partially.

11. The electronic device of claim 9, wherein the electronic device is a protection cover, and the external electronic device is a communication electronic device that is removably mounted in at least some area of the housing of the protection cover, and is configured to receive an electromagnetic field transmitted from the protection cover.

12. The electronic device of claim 11, wherein, when coupled with the external electronic device, the electronic device is configured to relay an electromagnetic field transmitted by the another external electronic device through the coil member of the electronic device, and to transmit the electromagnetic field to the external electronic device.

13. The electronic device of claim 12, wherein the coil member of the housing is configured to form a resonance frequency higher than an operating frequency range of the electromagnetic field transmitted by the another external electronic device.

* * * * *